July 7, 1959  H. J. EARL  2,893,776
BUMPERETTE MOUNTING MEANS
Filed Nov. 23, 1953
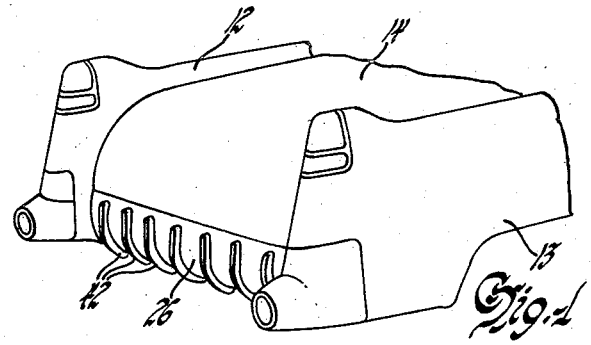
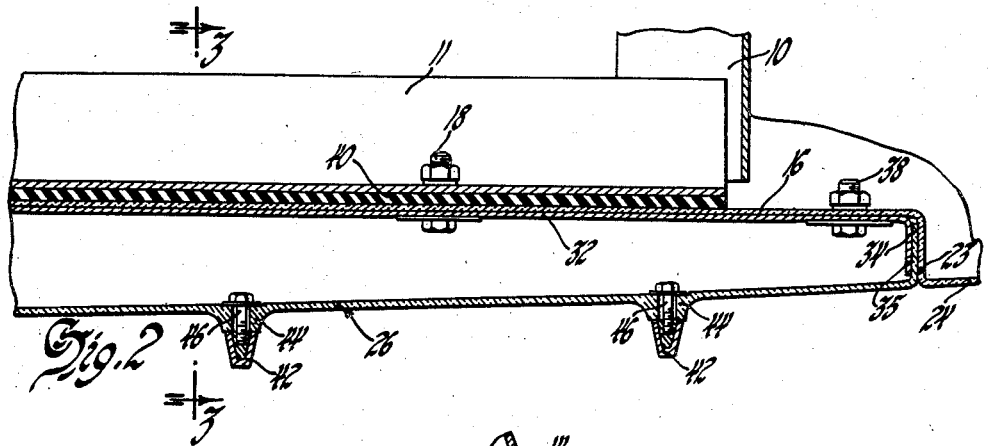
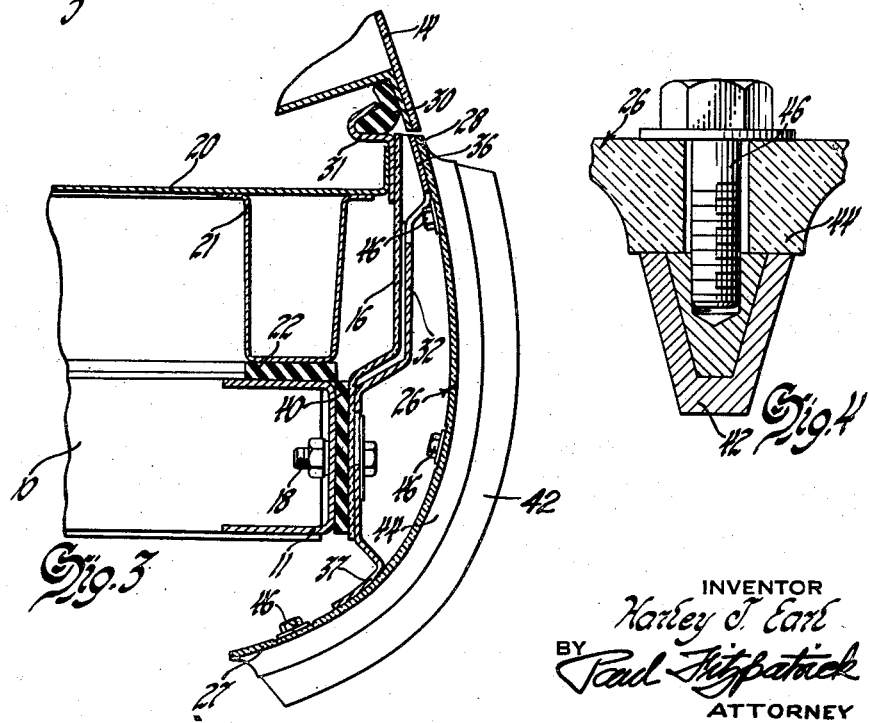
INVENTOR
Harley J. Earl
BY Paul Fitzpatrick
ATTORNEY

United States Patent Office 2,893,776
Patented July 7, 1959

---

2,893,776

BUMPERETTE MOUNTING MEANS

Harley J. Earle, Grosse Pointe Farms, Mich., assignor to General Motors Corporation, Detroit, Mich., a corporation of Delaware Application November 23, 1953, Serial No. 393,852

3 Claims. (Cl. 293—63)

---

This invention relates to a bumperette structure for an automobile, and more particularly to a structure wherein the bumperettes are mounted directly on the automobile body.

One feature of the invention is that it provides an improved bumperette structure for an automobile; another feature of the invention is that it provides a bumperette structure wherein the bumperettes are mounted on the automobile body, but the force of bumperette shocks of any substantial magnitude are transmitted to the chassis; a further feature of the invention is that the bumperettes are mounted directly on the body and backing means are provided between the body and the chassis to transmit bumperette shocks to said chassis; still another feature of the invention is that the backing means is yieldable, preferably comprising a backing plate connected to the body and to the chassis and having a resilient member, as a rubber block, in one of said connections; yet a further feature of the invention is that the body panel has thickened vertical ribs upon which the bumperettes are mounted, thereby increasing the strength of the structure and improving the appearance of the automobile.

Other features and advantages of the invention will be apparent from the following description and from the drawings, in which:

Fig. 1 is a fragmentary rear perspective view of the rear portion of an automobile, including the improved bumperette structure;

Fig. 2 is a fragmentary enlarged horizontal section through the rear end of the car of Fig. 1;

Fig. 3 is a vertical section taken along the line 3—3 of Fig. 2; and

Fig. 4 is an enlarged detail view of a portion of Fig. 2.

Referring now more particularly to the drawings, the automobile of Fig. 1 has a conventionally constructed chassis including a channel-shaped longitudinal chassis member 10 and a channel-shaped transverse rear chassis member 11. The main body structure of that portion of the automobile which is illustrated in the drawings includes rear fenders 12 and 13 and a hinged deck lid 14 (Fig. 1), and a rear transverse body brace 16 and a floor pan 20 (Fig. 3). Brace 16 lies immediately to the rear of chassis member 11. The automobile body preferably, but not necessarily, is made of plastic, and is mounted on the chassis by means of bolts, one bolt which secures the rear transverse brace 16 to the rear end of the chassis being shown at 18 in Figs. 2 and 3. The automobile floor pan 20 is mounted on the chassis by means of space supports 21 and is insulated from the chassis by a rubber block 22.

In conventional automobile assembly operations the automobile body is lowered as a unit onto the chassis as the chassis moves along the assembly line. In order to assemble the automobile in this manner, of course, no part of the body can underlie the chassis; but when the conventional rear bumper is replaced by bumperettes as illustrated in the drawings, the appearance of the rear end of the automobile may be improved by forming the rear end of the body with a forwardly extending portion which underlies the rear transverse chassis member 11. In addition to improving the appearance, this construction provides protection for the connections between the body and rear transverse chassis member by forming a hood or shield beneath these connections. However, such an underlying portion of the body would prevent the body from being lowered onto the chassis during assembly if the entire body were a unitary structure. Therefore, in the construction illustrated, in addition to the main body structure, there is a removable rear transverse body panel having a forwardly extending portion underlying the rear transverse chassis member 11, and means are provided for mounting this panel in abutting relation to the main body structure after the main body structure has been mounted on the chassis.

As shown in Fig. 2, the rear transverse brace 16 of the main body structure has rearwardly offset portions 23 so that the opposite side portions 24 of this panel are spaced rearwardly from the rear chassis member 11, and a removable rear body panel 26 is mounted in abutting relation to the main body parts. Panel 26 extends transversely across the lower rear portion of the car between the fenders 12 and 13 and has a curved portion 27 (Fig. 3) extending below and underlying the chassis member 11. The top edge 28 of the panel 26 abuts and effectively forms a continuation of the body contour of the deck lid 14, a weatherstrip 30 being mounted in a retainer 31 to form a seal for the lower edge of the deck lid 14. At its ends the panel 26 abuts the offset portion 24 of body brace 16. A backing plate 32 is secured to the panel 26, said panel having side flanges 34 (Fig. 2) and the backing plate 32 having complementary flanges 35 which may be fused to the flanges 34 if the plate and panel are made of plastic, or which may be welded if the parts are made of metal. The backing plate 32 has an upper flange 36 (Fig. 3) and a lower flange 37 which may similarly be fused or welded to the inner surface of the rear panel 26. Suitable openings may be formed in the backing plate 32 to permit access to the mounting bolt 18.

After the main body structure has been lowered onto the chassis, the removable assembly comprising the panel 26 and the backing plate 32 may be mounted, the plate 32 being connected to the body by bolt 38 and being connected to the chassis by bolt 18. A rubber block 40 is mounted in the chassis connection for a purpose to be hereinafter described.

A plurality of bumperettes 42 are mounted on the rear body panel 26, but the construction is such that the force of any shocks or bumps received by the bumperettes is not absorbed solely by the body, but is transmitted in part to the chassis despite the fact that the bumperettes are connected directly only to the body panel 26. In order to provide increased strength and to improve the appearance, the panel 26 is formed with a plurality of spaced parallel thickened vertical ribs 44, and one of the bumperettes 42 is mounted on each rib, the rib shape being complementary to the shape of the bumperette as shown best in Figs. 2 and 4. Bolts 46 secure the bumperettes to the panel 26.

While the bumperettes are mounted on the body panel 26, this body panel is connected to the chassis member 11 through yieldable backing means including the backing plate 32 and the rubber block 40, so that in the event of a shock on the bumperettes the force is transmitted to the chassis through this yieldable backing and the body will not be damaged by a shock of the same magnitude which can be absorbed without damage with conventional automobile bumper construction. The body panel 26 may be formed of metal or plastic, but preferably it is formed of plastic to provide added resilience to absorb shocks without permanent deformation, and a plastic body reinforced by the ribs 44 and provided with this bumperette construction will absorb without damage a shock substantially equal to the greatest shock which can be absorbed without damage when conventional bumper construction is used.

While I have shown and described one embodiment of my invention, it is capable of many modifications. Changes, therefore, in the construction and arrangement may be made without departing from the spirit and scope of the invention as set forth in the appended claims.

I claim:

1. In combination in an automobile, a chassis, a main body structure formed of sheet material mounted on said chassis and including a rear body brace transverse to the chassis, rearwardly thereof and adjacent thereto, a rear transverse body panel forming a transverse portion of the main body structure at the rear of the chassis, at least one bumperette mounted on the rear outer surface of said rear transverse body panel, a backing plate secured to said rear transverse body panel and having a main portion spaced forwardly of said rear transverse body panel and rearwardly of said chassis, means securing the main portion of the backing plate to said rear body brace, means connecting the main portion of the backing plate to the chassis, and a yieldable block between the main portion of the backing plate and the chassis.

2. In combination in an automobile, a chassis, a main body structure formed of sheet material mounted on said chassis and including a rear transverse body brace transverse to the chassis, rearwardly thereof and adjacent thereto, a rear transverse body panel forming a transverse portion of the main body structure at the rear of the chassis, a plurality of bumperettes mounted on the rear outer surface of said rear transverse body panel, each bumperette being thicker than the sheet material of the body structure measured in section through the bumperette and the rear transverse body panel, a backing plate having a main portion spaced forwardly of said rear transverse body panel and rearwardly of same chassis and having peripheral flanges disposed rearwardly of the main portion and secured to said rear transverse body panel to engage the top and bottom edges thereof, means securing the main portion of the backing plate to said rear body brace, means connecting the main portion of the backing plate to the chassis, and a yieldable block between the main portion of the backing plate and the chassis, whereby the force of shocks received by the bumperettes is transmitted to the chassis.

3. In combination in an automobile, a chassis having a transverse rear chassis member, a main body structure formed of sheet material mounted on said chassis and including a rear transverse body brace transverse to the chassis, rearwardly thereof and adjacent thereto, a rear transverse body panel forming a transverse portion of the main body structure at the rear of the chassis, a plurality of bumperettes mounted in spaced relation to each other on the rear outer surface of said rear transverse body panel, a backing plate having a main portion located closely adjacent said transverse rear chassis member and spaced forwardly of said rear transverse body panel and having peripheral flanges disposed rearwardly of the main portion and secured to the rear transverse body panel to engage the top and bottom edges thereof, means securing the main portion of the backing plate to said rear body brace, means connecting the main portion of the backing plate to the chassis, and a yieldable rubber block between the main portion of the backing plate and the chassis, whereby the force of shocks received by the bumperettes is transmitted to the chassis.

References Cited in the file of this patent

UNITED STATES PATENTS

| 461,759 | Koch | Oct. 20, 1891 |
| 1,496,967 | Andersen | June 10, 1924 |
| 1,988,924 | Thomas | Jan. 22, 1935 |
| 2,062,327 | Morrison | Dec. 1, 1936 |
| 2,113,616 | Flogaus | Apr. 12, 1938 |
| 2,169,376 | Voigt | July 25, 1939 |
| 2,194,459 | Frank | Mar. 26, 1940 |
| 2,612,964 | Hobbs | Oct. 7, 1952 |

FOREIGN PATENTS

| 627,022 | France | Sept. 24, 1927 |
| 1,035,216 | France | Aug. 19, 1953 |
| 449,396 | Great Britain | June 22, 1936 |